J. H. ALLISON.
PACKING GASKET.
APPLICATION FILED JULY 26, 1919.
1,359,142.
Patented Nov. 16, 1920.
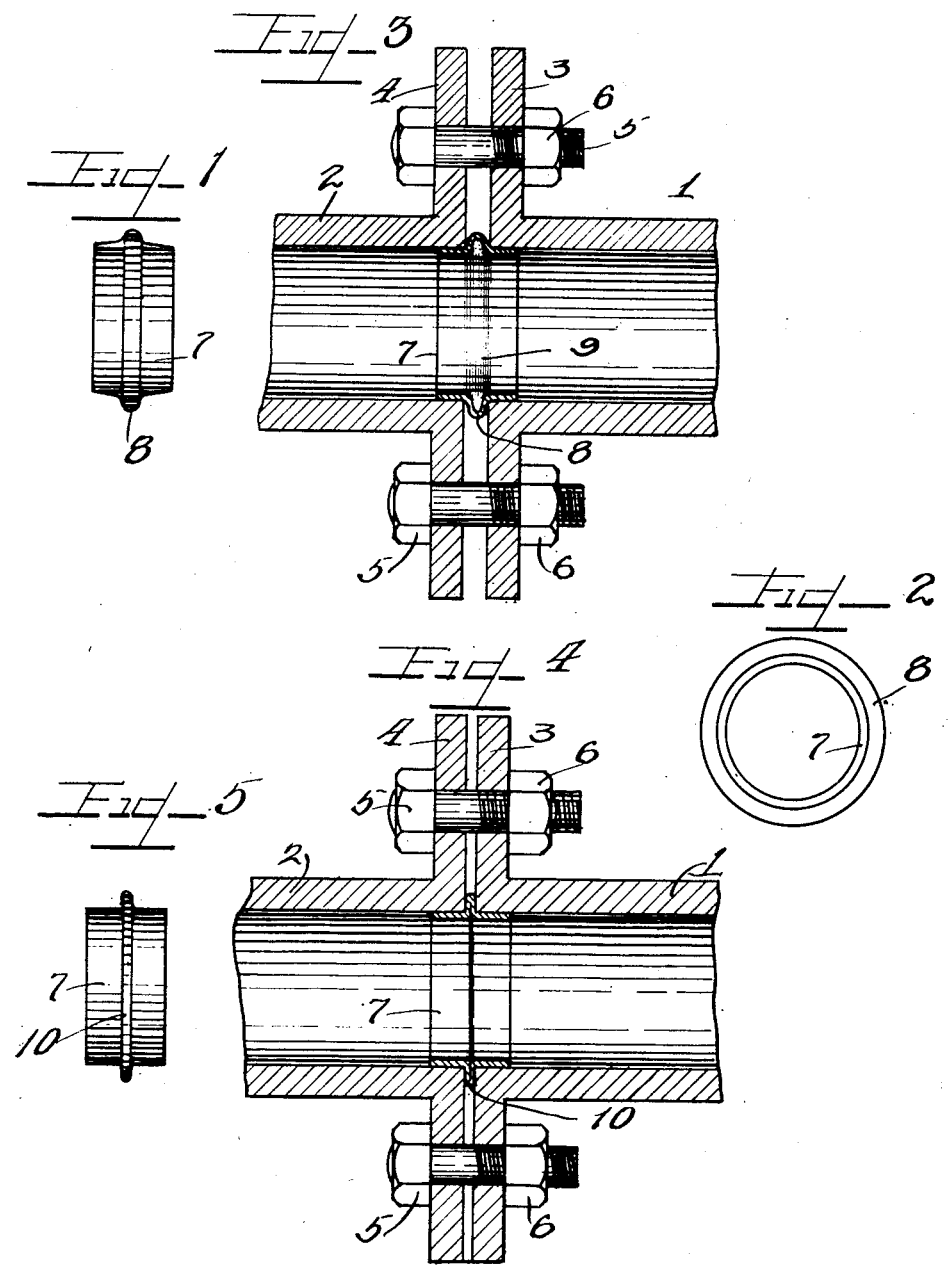

UNITED STATES PATENT OFFICE.

JESSE H. ALLISON, OF EL PASO, TEXAS, ASSIGNOR OF ONE-HALF TO L. G. HADLEY, OF EL PASO, TEXAS.

PACKING-GASKET.

1,359,142.  Specification of Letters Patent.  Patented Nov. 16, 1920.

Application filed July 26, 1919. Serial No. 313,518.

*To all whom it may concern:*

Be it known that I, JESSE H. ALLISON, a citizen of the United States, and a resident of the city of El Paso, in the county of El Paso, State of Texas, have invented certain new and useful improvements in Packing-Gaskets; and I do hereby declare that the following is a full, clear, and exact description of the same, reference being had to the accompanying drawings, and to the numerals of reference marked thereon, which form a part of this specification.

This invention relates more particularly to an improved type of a one piece metal gasket or packing ring adapted to insure a tight joint between two pipes the adjacent ends of which are flanged and bolted together.

It is an object of this invention to provide a one piece metal pipe-joint or gasket.

Another object of the invention is the construction of a unitary metal gasket, swaged to afford a compressible peripheral bead.

A further object of the invention is to construct a one piece metal pipe-joint having an integral internally grooved ring formed thereon and adapted to be compressed between the adjacent flanged ends of pipes, when said pipes are bolted together.

It is an important object of this invention to provide a non-leaking joint between connected pipes by the use of a soft metal gasket which is adapted to be shortened as an integral grooved circumferential flange thereof is pinched between the adjacent ends of said pipes as they are drawn together.

Other and further important objects of this invention will be apparent from the disclosures in the drawings and specification.

My invention (in a preferred form) is illustrated in the drawings and hereinafter more fully described.

On the drawings:

Figure 1 is a side elevation of a gasket embodying the principles of the invention.

Fig. 2 is an end view thereof.

Fig. 3 is a longitudinal section of two connected pipes showing the gasket in position before compression thereof.

Fig. 4 is a similar section with the pipe flanges drawn together to pinch the grooved gasket ring to form a non-leaking joint.

Fig. 5 is a side elevation of the compressed gasket removed from the pipes.

As shown on the drawings:—

The reference numerals 1 and 2, indicate two alined pipes, having integrally formed on the adjacent ends thereof apertured flanges 3 and 4, respectively. Engaged through the registering apertures of the pipe flanges 3 and 4 are bolts 5 adapted to draw the pipes together when the nuts 6, of said bolts are threaded on the bolts.

To form a tight non-leaking pipe-joint between the connected pipes 1 and 2, a soft metal one piece gasket, coupling or packing member is engaged in and between said pipes as shown in Fig. 3. The gasket is made of copper, brass or other suitable metal and comprises a cylindrical sleeve or bushing 7, slightly tapered toward each end. The sleeve 7, is swaged to provide an integral circumferential bead, rib or ring 8, intermediate the ends thereof. The ring 8, is formed with an inner circular groove 9.

When the gasket is placed in position the tapered ends thereof are projected into the adjacent ends of the pipes 1 and 2, leaving the gasket ring 8, disposed between the pipe flanges 3 and 4, as shown in Fig. 3. The ends of the sleeve 7, are slightly tapered to insure a tighter fit with the inner surfaces of said pipes when they are drawn together.

With the one piece grooved metal gasket or union in place as described the pipes are drawn together by threading the nuts 6 farther onto the bolt 5, thereby simultaneously shortening the gasket by pinching and forcing the opposite sides of the gasket ring 8, toward each other until the groove 9, substantially is closed as shown in Fig. 4. The ring 8, is thus reduced by compression to form the flattened packing flange 10, as shown in Figs. 4 and 5. The pipe-joint formed as described affords an air and liquid tight union or connection for the pipes 1 and 2.

It will of course be understood that the one piece soft metal gasket may be constructed in various different forms other than the cylindrical form shown and described.

I am aware that numerous details of construction may be varied through a wide range without departing from the principles of this invention and I therefore do not purpose limiting the patent granted further than necessitated by the prior art.

I claim as my invention:—

1. A packing gasket comprising a soft metal sleeve swaged to afford an integral internally grooved circumferential ring thereon intermediate the ends thereof, the outside diameter of the base of said ring being slightly larger than the inside diameter of the pipe for which it is designed and the outside diameter of the edges of the gasket being exactly equal to the inside diameter of the pipe.

2. The combination with a pair of pipes, of means for connecting the same, a tapered one piece metal sleeve projecting into the adjacent ends of said pipes and a grooved ring on said sleeve adapted to have the sides thereof pinched together between said pipe ends to reduce the groove and compress the sleeve to form a tight joint when said means are tightened, the outside diameter of the base of said grooved ring being slightly larger than the inside diameter of the pipes, and the outside diameter of the ends of the ring being equal to the inside diameter of the pipes.

In testimony whereof I have hereunto subscribed my name in the presence of two subscribing witnesses.

JESSE H. ALLISON.

Witnesses:
GEO. GREENBERG,
I. ALARCON.